(12) United States Patent
Mohammed et al.

(10) Patent No.: US 9,676,418 B1
(45) Date of Patent: Jun. 13, 2017

(54) VEHICLE CROSSMEMBER ASSEMBLY WITH PEDESTAL DETACHMENT

(71) Applicants: Abdul Kareem Mohammed, Rochester Hills, MI (US); Zheng Qin, Troy, MI (US); Hassan H El-Hor, Ann Arbor, MI (US); Rajkumar Rajagopalan, Troy, MI (US); Rebecca L Tanguay, Troy, MI (US); Michael G Dreer, Rochester, MI (US); Amanda J French, Orion, MI (US); Alan J Demorow, Allen Park, MI (US)

(72) Inventors: Abdul Kareem Mohammed, Rochester Hills, MI (US); Zheng Qin, Troy, MI (US); Hassan H El-Hor, Ann Arbor, MI (US); Rajkumar Rajagopalan, Troy, MI (US); Rebecca L Tanguay, Troy, MI (US); Michael G Dreer, Rochester, MI (US); Amanda J French, Orion, MI (US); Alan J Demorow, Allen Park, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/996,508

(22) Filed: Jan. 15, 2016

(51) Int. Cl.
*B62D 21/11* (2006.01)
*B62D 21/15* (2006.01)
*B60R 19/34* (2006.01)

(52) U.S. Cl.
CPC ............ *B62D 21/152* (2013.01); *B60R 19/34* (2013.01); *B62D 21/11* (2013.01); *B62D 21/15* (2013.01); *B62D 21/155* (2013.01)

(58) Field of Classification Search
CPC ...... B62D 21/11; B62D 21/15; B62D 21/152; B62D 21/155; B60R 19/34
See application file for complete search history.

(56) References Cited

U.S. PATENT DOCUMENTS

| 5,533,780 | A |   | 7/1996 | Larson et al. |   |
|---|---|---|---|---|---|
| 5,605,353 | A | * | 2/1997 | Moss | ..................... B62D 21/09 188/376 |
| 6,029,765 | A | * | 2/2000 | Chou | ................... B60K 5/1216 180/292 |

(Continued)

FOREIGN PATENT DOCUMENTS

| JP | 07267132 A | * | 10/1995 |
| JP | 11105744 A | * | 4/1999 |
| WO | 2013024219 A1 |   | 2/2013 |

*Primary Examiner* — Laura Freedman
(74) *Attorney, Agent, or Firm* — Ralph E. Smith

(57) ABSTRACT

A vehicle crossmember assembly including a pair of main rails, a crossmember, and a pair of pedestals is provided. The main rails are laterally spaced apart. The crossmember is transverse to the main rails. The pedestals extend between and connect lateral ends of the crossmember to the main rails. Each pedestal has a lower end disposed adjacent to the crossmember and an upper end that projects upwardly from the crossmember. Fasteners connect the pedestals to the main rails. Each pedestal has a sleeve disposed at the upper end. Each sleeve has a sleeve wall defining a bore that receives one of the fasteners and each sleeve has a slit in the sleeve wall. Each slit provides a release path through which one of the fasteners can pull through the sleeve wall during an impact event, allowing the pedestals to detach from the main rails.

20 Claims, 7 Drawing Sheets

(56) References Cited

U.S. PATENT DOCUMENTS

| | | | | |
|---|---|---|---|---|
| 6,203,098 | B1 * | 3/2001 | Motozawa | B62D 21/152 293/133 |
| 6,270,152 | B1 * | 8/2001 | Sato | B62D 21/11 296/192 |
| 6,769,733 | B2 | 8/2004 | Seksaria et al. | |
| 7,066,531 | B2 * | 6/2006 | Tomita | B62D 25/082 180/68.5 |
| 7,117,926 | B2 | 10/2006 | Mori et al. | |
| 7,380,829 | B2 * | 6/2008 | Kishima | B62D 21/155 180/232 |
| 7,393,016 | B2 * | 7/2008 | Mitsui | B62D 25/08 180/232 |
| 7,562,886 | B2 * | 7/2009 | Takeda | B62D 21/155 180/232 |
| 7,926,609 | B2 * | 4/2011 | Kusaka | B60G 99/004 180/232 |
| 8,267,429 | B2 * | 9/2012 | Takeshita | B62D 21/11 280/784 |
| 8,393,673 | B2 * | 3/2013 | Terada | B62D 25/088 296/187.09 |
| 8,480,102 | B2 * | 7/2013 | Yamada | B62D 21/11 180/311 |
| 8,490,988 | B2 * | 7/2013 | Takeshita | B62D 21/11 280/124.109 |
| 8,532,881 | B2 * | 9/2013 | Ostling | F42B 3/006 180/271 |
| 8,794,646 | B1 * | 8/2014 | Onishi | B62D 21/155 280/124.109 |
| 8,985,630 | B2 * | 3/2015 | Sangha | B62D 27/065 280/124.109 |
| 9,150,253 | B2 * | 10/2015 | Watanabe | B62D 21/11 |
| 9,254,872 | B2 * | 2/2016 | Otani | B62D 21/155 |
| 2016/0236718 | A1 * | 8/2016 | Tatsuwaki | B62D 21/155 |

\* cited by examiner

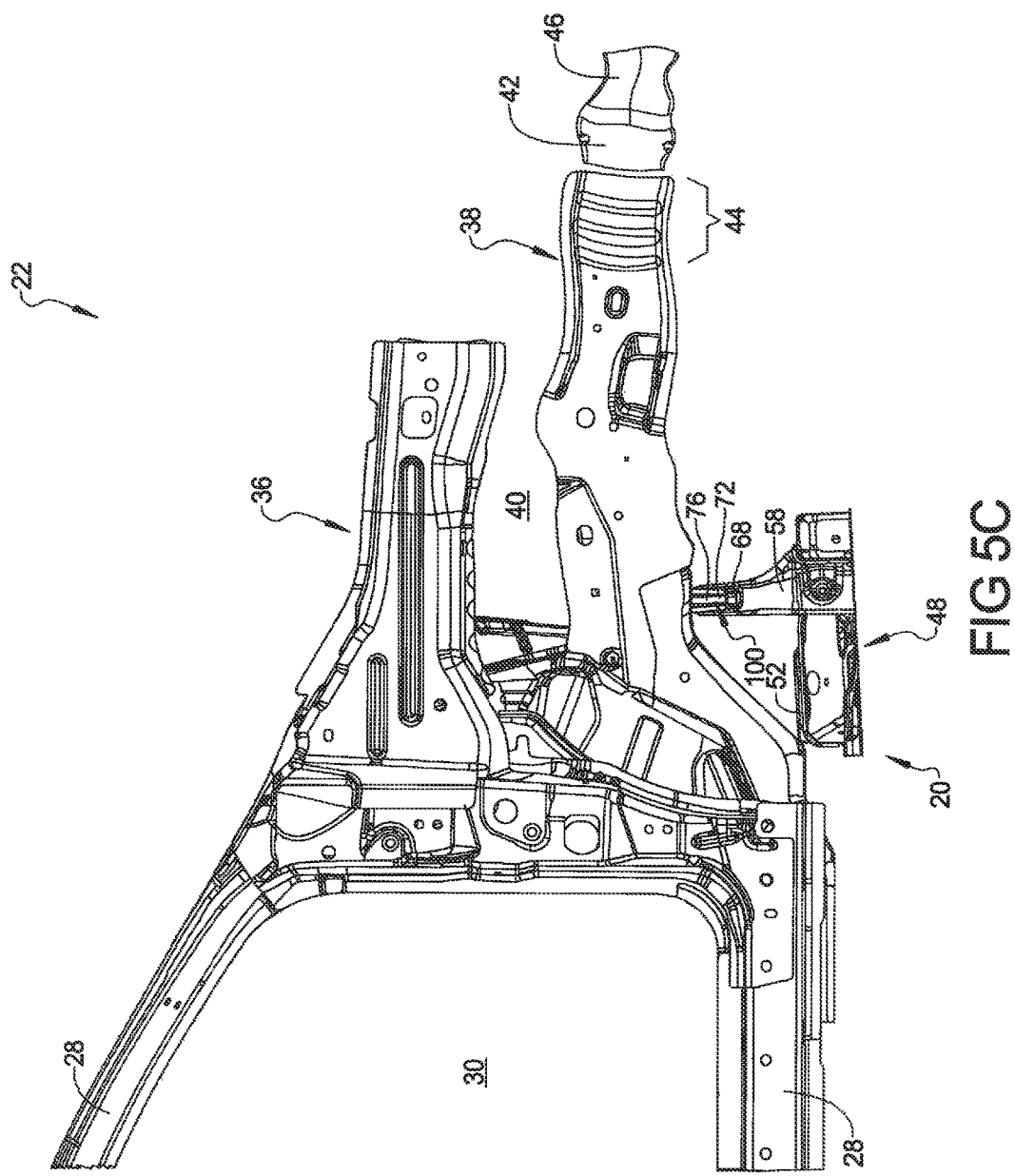

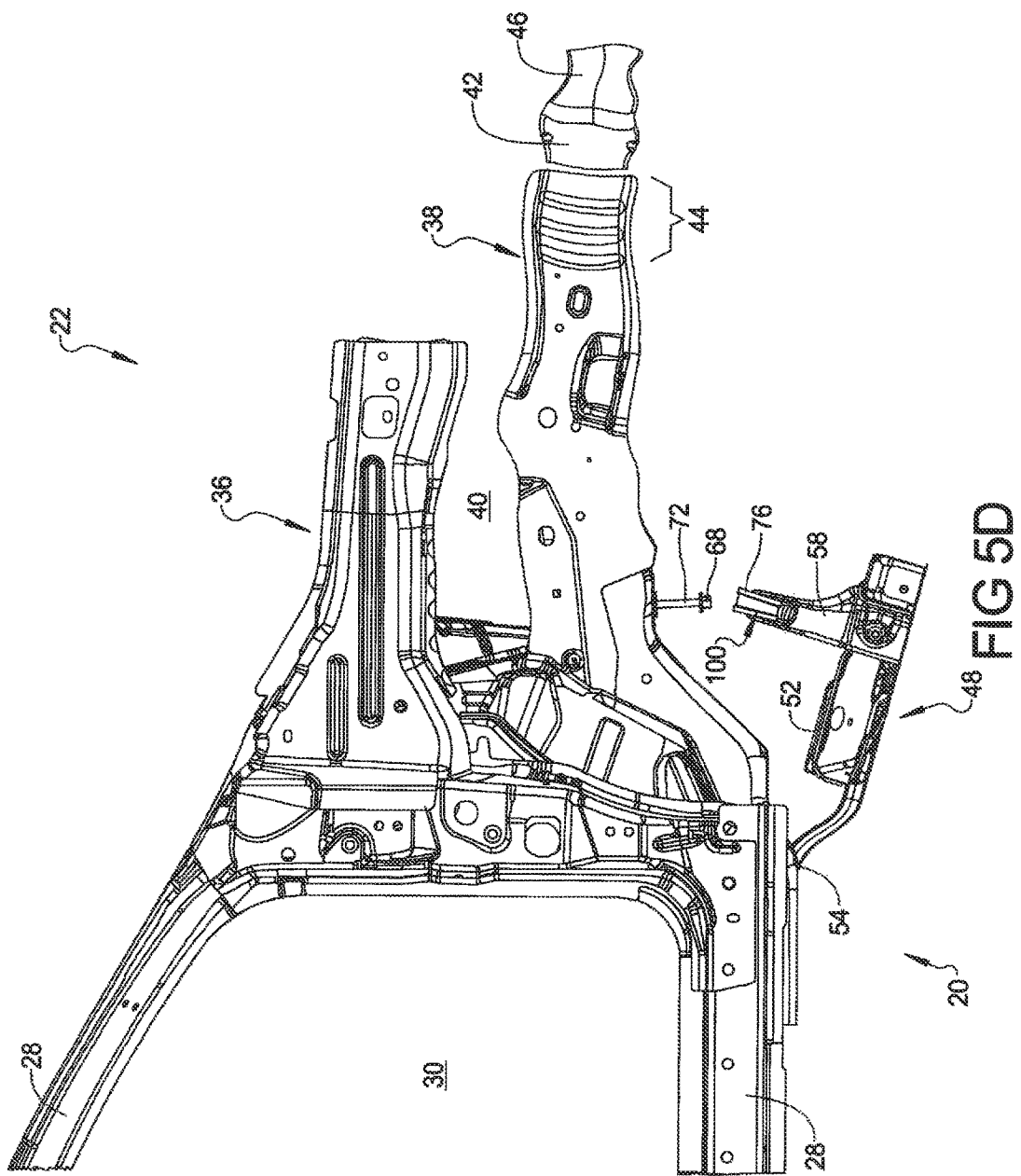

VEHICLE CROSSMEMBER ASSEMBLY WITH PEDESTAL DETACHMENT

FIELD

The subject disclosure generally relates to vehicle crossmember assemblies and more particularly to a crossmember assembly that is mounted to a vehicle using pedestals that detach from the vehicle during an impact event.

BACKGROUND

This section provides background information related to the present disclosure which is not necessarily prior art.

A crossmember assembly is a subassembly of a vehicle chassis. Such crossmember assemblies include a crossmember that extends across a vehicle in a transverse direction, from one side of the vehicle to the other. Typically, the crossmember supports an engine of the vehicle or other drivetrain components. In most vehicles, the crossmember is bolted to or otherwise fixedly connected to a frame of the vehicle or other structure of the chassis. In addition to providing structural support for the vehicle during normal driving conditions, the vehicle chassis transmits forces through the vehicle during an impact event such as an automobile accident (i.e. a car crash). Because the crossmember assembly in most vehicles is part of or is connected to the vehicle chassis, the crossmember assembly typically influences the crash performance of the vehicle. For example, the structure and location of the crossmember assembly can influence where and how the vehicle chassis bends, deforms, and/or crumples during the impact event.

SUMMARY

This section provides a general summary of the disclosure, and is not a comprehensive disclosure of its full scope or all of its features.

The subject disclosure provides for a crossmember assembly of a vehicle. The crossmember assembly includes a pair of main rails, a crossmember, and a pair of pedestals. The pair of main rails are laterally spaced apart from one another. The crossmember is transverse to the pair of main rails and extends laterally between a pair of lateral ends. The pair of pedestals extend between and connect the pair of lateral ends of the crossmember to the pair of main rails respectively. Each pedestal has a lower end disposed adjacent to the crossmember and an upper end that projects upwardly away from the crossmember. A pair of fasteners connects the pair of pedestals to the pair of main rails, respectively. Each pedestal has a sleeve disposed at the upper end. Each sleeve has a sleeve wall defining a bore therein that is configured to receive one of the fasteners. Each sleeve has a slit that extends through the sleeve wall. Each slit provides a release path through which one of the fasteners can pull through the sleeve wall during an impact event. Accordingly, the slits allow each pedestal to detach from the main rails during the impact event so that the crossmember does not limit the pair of main rails from deforming and/or deflecting to a maximum extent. Advantageously, the deformation and/or deflection of the pair of main rails absorbs some of the impact energy during the impact event and can reduce deceleration pulses that are transmitted through the vehicle during the impact event.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5C is another side elevation view of the exemplary crossmember assembly shown in FIG. 1 that illustrates the pedestal while the impact event is occurring where detachment of the pedestal has occurred; and FIG. 5D is another side elevation view of the exemplary crossmember assembly shown in FIG. 1 that illustrates the pedestal while the impact event is occurring where the pedestal and the crossmember have dropped away following detachment.

DETAILED DESCRIPTION

Referring to the Figures, wherein like numerals indicate corresponding parts throughout the several views, a crossmember assembly 20 of a vehicle 22 is provided.

Figure 1:
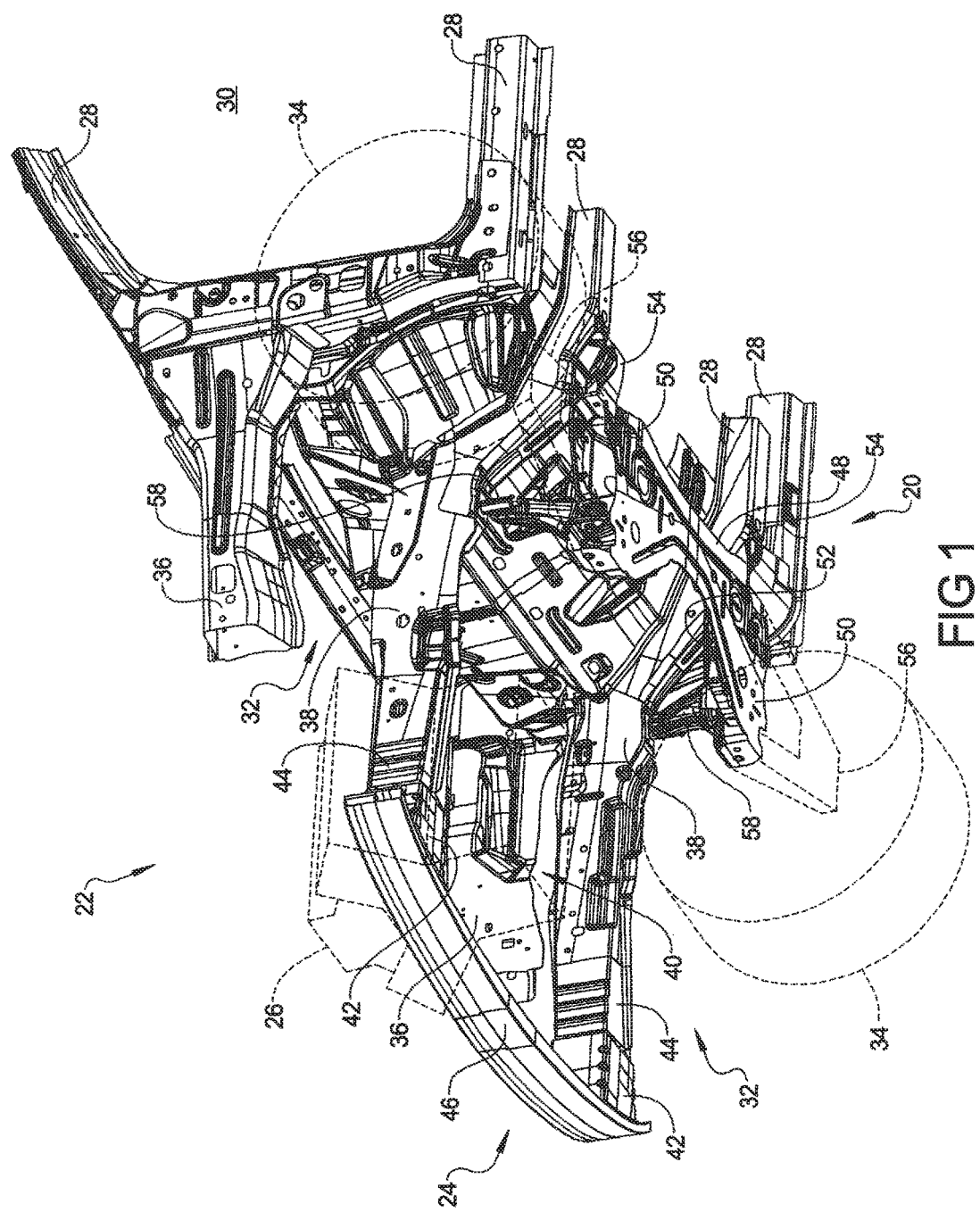
FIG. 1 is a side perspective view of an exemplary crossmember assembly that has been constructed in accordance with the subject disclosure.

With reference to FIG. 1, the crossmember assembly 20 shown is located at a front end 24 of the vehicle 22; however, the illustrated example is not intended to be limiting and it should be understood that the crossmember assembly 20 of the subject disclosure could alternatively be located at a rear end of the vehicle 22 (not shown). The crossmember assembly 20 disclosed is part of a chassis assembly that generally supports the other components of the vehicle 22 and transmits forces through the vehicle 22, including when the vehicle 22 is involved in an impact event (e.g. a car crash). In at least some vehicle configurations, the crossmember assembly 20 is utilized to support an engine 26 of the vehicle 22. Accordingly, the crossmember assembly 20 of the subject disclosure is equally applicable to many different types of vehicles, including without limitation, front-engine vehicles, mid-engine vehicles, rear-engine vehicles, front-wheel drive vehicles, rear-wheel drive vehicles, all-wheel drive/four-wheel drive vehicles, body-on-frame vehicles, unibody vehicles, and the like. In FIG. 1, the exemplary vehicle 22 shown is a front-engine, all-wheel drive, unibody vehicle. The vehicle 22 generally includes a vehicle body structure 28 that defines a passenger compartment 30. The vehicle body structure 28 may include one or more frame components, firewall components, roof components, floor components, and body panel components. In the example illustrated, the vehicle body structure 28 also defines a pair of front wheel wells 32 that are each sized to receive a front wheel 34 of the vehicle 22. The vehicle body structure 28 has a pair of upper load beams 36 that extend forward from the passenger compartment 30 toward the front end 24 of the vehicle 22. The pair of upper load beams 36 are laterally spaced apart and are arranged in a substantially parallel relationship to one another. The term "substantially parallel" is used herein to describe elements that are generally aligned with one another plus or minus 5 degrees. The pair of front wheel wells 32 are disposed below the pair of upper load beams 36 such that the pair of upper load beams 36 are generally positioned above the front wheels 34 when the vehicle 22 is fully assembled.

The crossmember assembly 20 includes a pair of main rails 38 that are disposed adjacent to the pair front wheel wells 32. The main rails 38 provide structural support for the vehicle body structure 28. The pair of main rails 38 are laterally spaced apart from one another and are arranged in a substantially parallel relationship such that an engine compartment 40 is defined between the pair of main rails 38 (i.e. the engine compartment 40 is laterally bounded on each side by the pair of main rails 38). When the vehicle 22 is fully assembled, the engine 26 is located in the engine compartment 40 and is therefore disposed between the pair of main rails 38. The pair of main rails 38 each terminate at a crash can 42. Each crash may have corrugated walls and a hollow cross-section that allow each crash can 42 to deform (e.g. crumple) during an impact event. In addition, the pair of main rails 38 each includes a crumple section 44 defined by corrugated walls and a hollow cross-section that allow each crumple section 44 to deform (e.g. crumple) during an impact event. As an example, the crash can 42 and the crumple section 44 of each of the main rails 38 may compress longitudinally when the impact event is a front-end collision (e.g. when the front end 24 of the vehicle 22 collides with an object or another vehicle 22). A front bumper 46 may be disposed at the front end 24 of the vehicle 22. The front bumper 46 illustrated extends laterally between and is fixedly connected to the crash cans 42. As such, the engine compartment 40 may be longitudinally bounded by the front bumper 46 to the front and the passenger compartment 30 to the rear.

The crossmember assembly 20 also includes a crossmember 48 that is transverse to and disposed below the pair of main rails 38. The crossmember 48 shown in FIG. 1 extends laterally between the pair of front wheel wells 32 and terminates at a pair of lateral ends 50. The crossmember 48 has an upper surface 52 disposed between the pair of lateral ends 50 that is configured to fixedly connect to and at least partially support the engine 26 of the vehicle 22. By way of example and without limitation, the engine 26 of the vehicle 22 may be bolted to the upper surface 52 of the crossmember 48. As such, the engine compartment 40 is generally positioned above the upper surface 52 of the crossmember 48. The crossmember 48 may further include a pair of body mounts 54 that extend away from the front end 24 of the vehicle 22 and toward the passenger compartment 30. The pair of body mounts 54 of the crossmember 48 may be fixedly connected to the vehicle body structure 28 at locations disposed beneath the engine compartment 40 or beneath the passenger compartment 30. In order to isolate the vehicle body structure 28 from vibration and noise transmitted from the engine 26 to the crossmember 48, the pair of body mounts 54 of the crossmember 48 may include bushings or isolator bolts disposed between the pair of body mounts 54 and the vehicle body structure 28.

Still referring to FIG. 1, a pair of suspension control arms 56 are pivotally connected to the pair of lateral ends 50 of the crossmember 48. Each respective suspension control arm 56 extends laterally into one of the front wheel wells 32 to support one of the front wheels 34 of the vehicle 22. It should be appreciated that other suspension components of the vehicle, not shown in FIG. 1, may include upper A-arms, shock absorbers, knuckles, wheel hubs or spindles, and suspension springs (such as coil springs, leaf springs, or air springs). As such, the pair of suspension control arms 56 may be shaped to accommodate vertically oriented shock absorbers and/or suspension springs. Together, the pair of suspension control arms 56 and the other suspension components allow the front wheels 34 of the vehicle 22 to travel up and down in relation to the crossmember 48, the pair of main rails 38, and the vehicle body structure 28.

Figure 2:
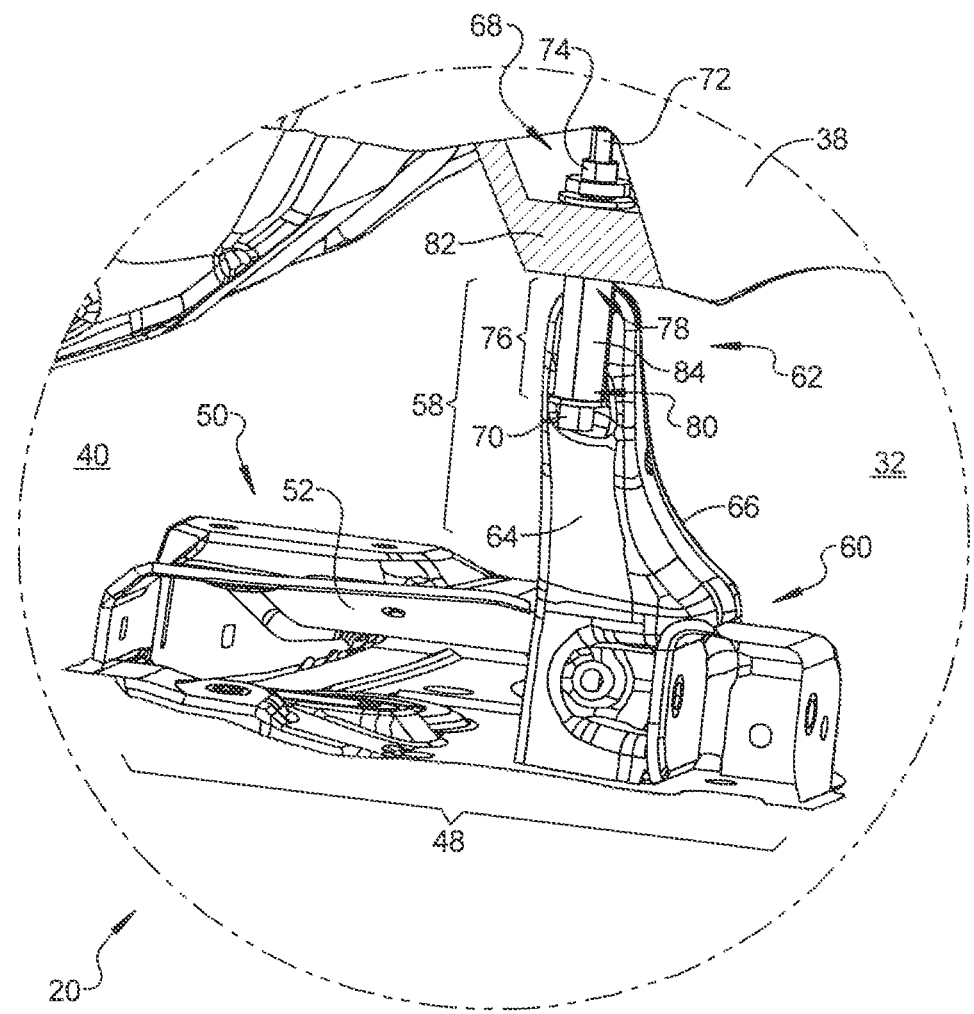
FIG. 2 is a partial enlarged side perspective view of one pedestal of the exemplary crossmember assembly shown in FIG. 1.

With additional reference to FIG. 2, the crossmember assembly 20 includes a pair of pedestals 58 that extend between and fixedly connect the pair of lateral ends 50 of the crossmember 48 to the pair of main rails 38, respectively. Each pedestal 58 has a lower end 60 and an upper end 62. The lower end 60 of each pedestal 58 is disposed adjacent to the upper surface 52 of the crossmember 48. In the illustrated example, the lower ends 60 of the pair of pedestals 58 are arranged in contact with the upper surface 52 of the crossmember 48 at locations disposed adjacent the pair of lateral ends 50 of the crossmember 48. The upper ends 62 of the pair of pedestals 58 are disposed adjacent to the pair of main rails 38 and the upper end 62 of each pedestal 58 projects upwardly away from the crossmember 48 and is positioned opposite the lower end 60. As a result, the pair of pedestals 58 are upstanding relative to the upper surface 52 of the crossmember 48. Each pedestal 58 also has an inboard side 64 that faces the engine compartment 40 and an outboard side 66 that faces away from the engine compartment 40. As such, the outboard sides 66 of the pair of pedestals 58 face outwardly toward the pair of front wheel wells 32 and thus the front wheels 34.

A pair of fasteners 68 fixedly connects the pair of pedestals 58 to the pair of main rails 38. It should be appreciated that the pair of fasteners 68 may take many different forms without departing from the scope of the subject disclosure. By way of non-limiting example, the pair of fasteners 68 may be bolts, screws, studs, pins, rivets, or other suitable fastener structures. In the illustrated example, the pair of fasteners 68 are bolts. As best seen in FIG. 2, each fastener 68 includes a head portion 70, a shank portion 72 that is threaded along at least part of its length, and a nut 74 that is threadably received on the shank portion 72. Each pedestal 58 has a sleeve 76 disposed at the upper end 62. Although other configurations are possible, in the illustrated example each sleeve 76 is supported on and extends from the outboard side 66 of each pedestal 58. The sleeve 76 of each pedestal 58 may be integral with the upper end 62 of the pedestal 58 or may be a separate component part that is connected, coupled, or otherwise attached to the upper end 62 of the pedestal 58. By way of example and without limitation, the sleeves 76 may be connected to the upper ends 62 of the pair of pedestals 58 by welding, adhesive, or fasteners (including use of any of the fasteners listed above).

Figure 3:
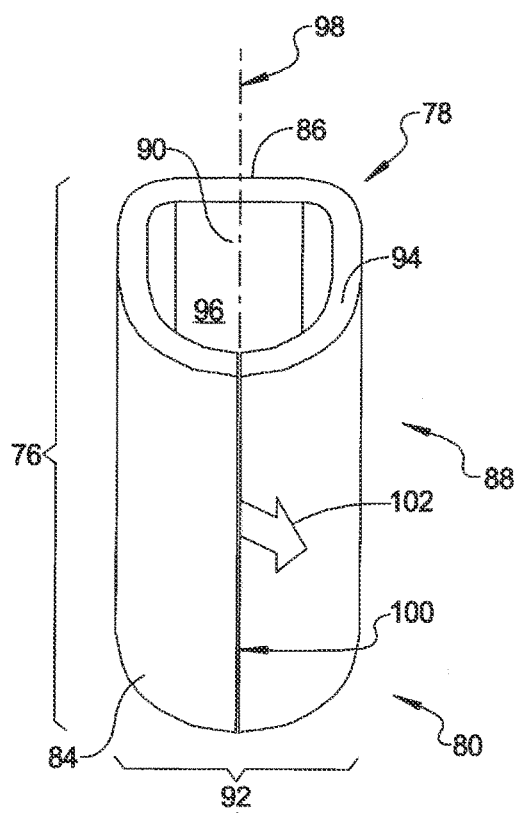
FIG. 3 is an enlarged top perspective view of a sleeve of the pedestal shown in FIG. 2.
Figure 4:
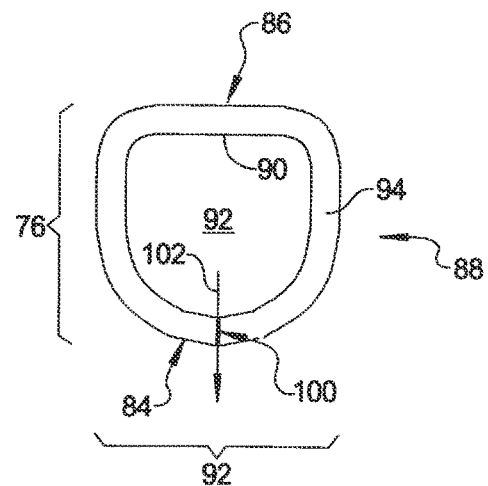
FIG. 4 is an enlarged top perspective view of the sleeve shown in FIG. 3.

With additional reference to FIGS. 3 and 4, each sleeve 76 has a first end 78 and a second end 80 that is positioned opposite the first end 78. The first ends 78 of the sleeves 76 are positioned adjacent to the pair of main rails 38 such that the first end 78 of each sleeve 76 is disposed in an abutting relationship with one of the main rails 38. As shown in FIG. 2, the second end 80 of each sleeve 76 abuts the head portion 70 of one of the fasteners 68. The shank portion 72 of each fastener 68 extends through each respective sleeve 76 and into one of the main rails 38 and the nut 74 of each fastener 68 abuts one of the main rails 38 respectively. Accordingly, the first end 78 of each sleeve 76 and the nut 74 of each respective fastener 68 oppose one another and tighten against a rail wall 82 of each of the main rails 38 when the nuts 74 are secured on threads of the shank portion 72 of each fastener 68.

As best seen in FIGS. 3 and 4, each sleeve 76 also has an interior side 84 that faces the engine compartment 40 and an exterior side 86 that faces away from the engine compartment 40. As such, the exterior sides 86 of the sleeves 76 face outwardly toward the pair of front wheel wells 32 and thus the front wheels 34. Accordingly, in configurations where the sleeves 76 and the pair of pedestals 58 are separate components, the interior side 84 of the sleeves 76 may abut the outboard sides 66 of the pair of pedestals 58 when the sleeves 76 are attached to the pair of pedestals 58. The sleeve 76 of each pedestal 58 may have a variety of different cross-sectional shapes without departing from the scope of the subject disclosure. In the illustrated example, each sleeve 76 has a D-shaped cross-section 88. The D-shaped cross-section 88 of each sleeve 76 has a flat portion 90 disposed along the interior side 84 of the sleeve 76 and a curved portion 92 disposed along the exterior side 86 of the sleeve 76.

With continued reference to FIGS. 3 and 4, each sleeve 76 has a sleeve wall 94 defining a bore 96 that extends through the sleeve 76 along a bore axis 98. The bore 96 of each sleeve 76 is open at the first and second ends 78, 80. The bore 96 of each sleeve 76 receives the shank portion 72 of one of the fasteners 68 with the shank portion 72 of each fastener 68 extending substantially parallel to the bore axis 98 of each respective sleeve 76. Each sleeve 76 also has a slit 100 passing through the sleeve wall 94 and extending between the first end 78 and the second end 80 of the sleeve 76. The slit 100 of each sleeve 76 may be provided in a variety of different shapes and orientations without departing from the scope of the subject disclosure. In the example illustrated, the slit 100 extends in a straight line in a direction that is substantially parallel to and spaced from the bore axis 98 (e.g. the slits 100 extend in a substantially vertical direction). Advantageously, each slit 100 provides a release path 102 through which the shank portion 72 of one of the fasteners 68 pulls through the sleeve wall 94 during an impact event to detach each pedestal 58 from each main rail 38, respectively. The detachment of the pair of pedestals 58 from the pair of main rails 38 can enhance crash performance of the vehicle 22, particularly where the impact event is a front-end collision.

Figure 5A:
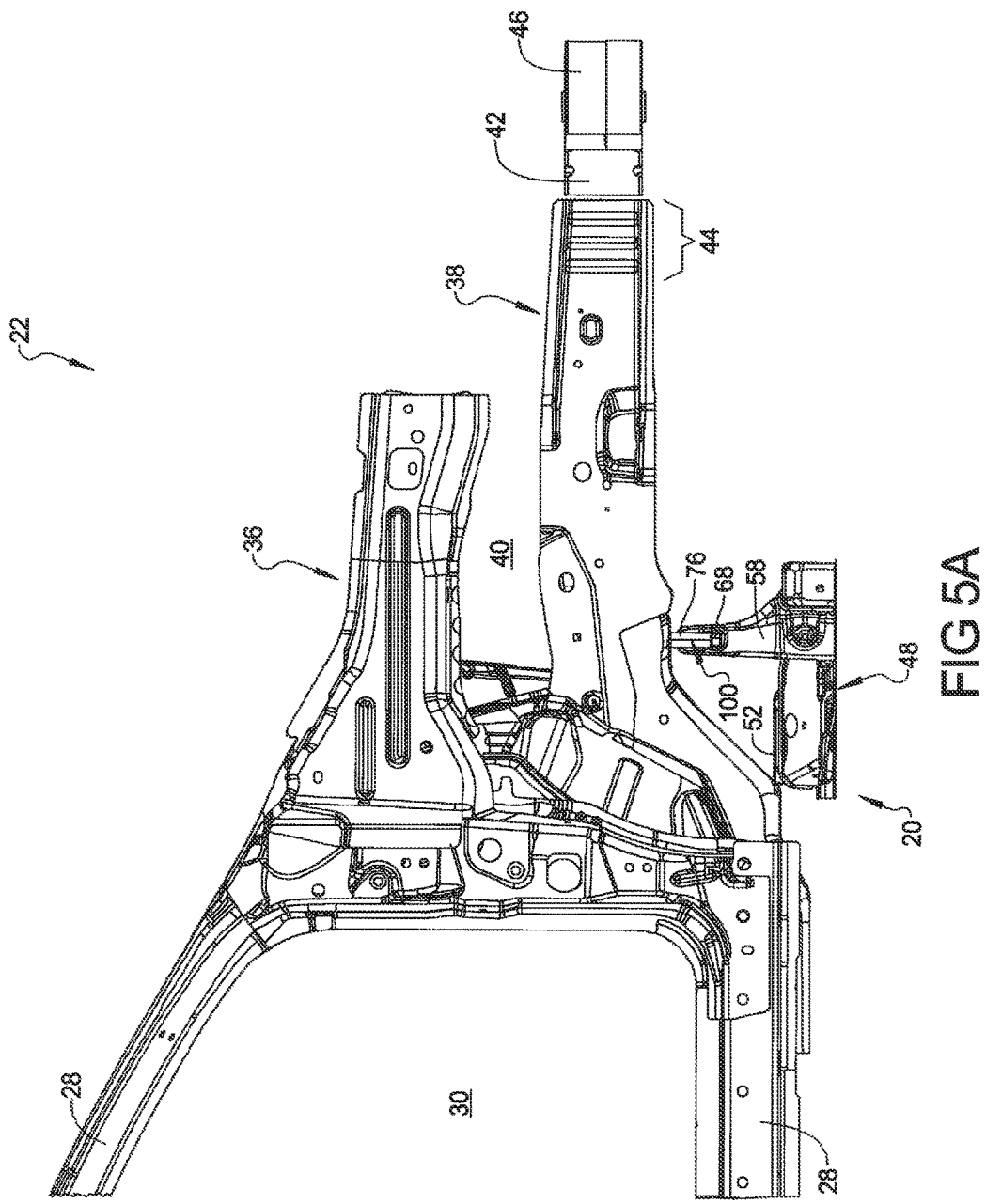
FIG. 5A is a side elevation view of the exemplary crossmember assembly shown in FIG. 1 that illustrates the pedestal before an impact event has occurred.

With additional reference to FIGS. 5A-D, detachment of the pair of pedestals 58 from the pair of main rails 38 during an impact event is illustrated in sequential stages throughout the multiple views. FIG. 5A shows the crossmember assembly 20 before the impact event occurs. The pair of main rails 38 and the pedestals 58 are in a pre-crash condition where the pair of main rails 38 are not crumpled or deformed and where the shank portion 72 of each fastener 68 is fully received in the respective bore 96 of each pedestal 58. As such, the sleeves 76 may be described as 'closed' in FIG. 5A because the slit 100 in each sleeve 76 is narrower than the shank portion 72 of the fasteners 68 such that the sleeves 76 retain the pair of pedestals 58 on the pair of main rails 38.

Figure 5B:
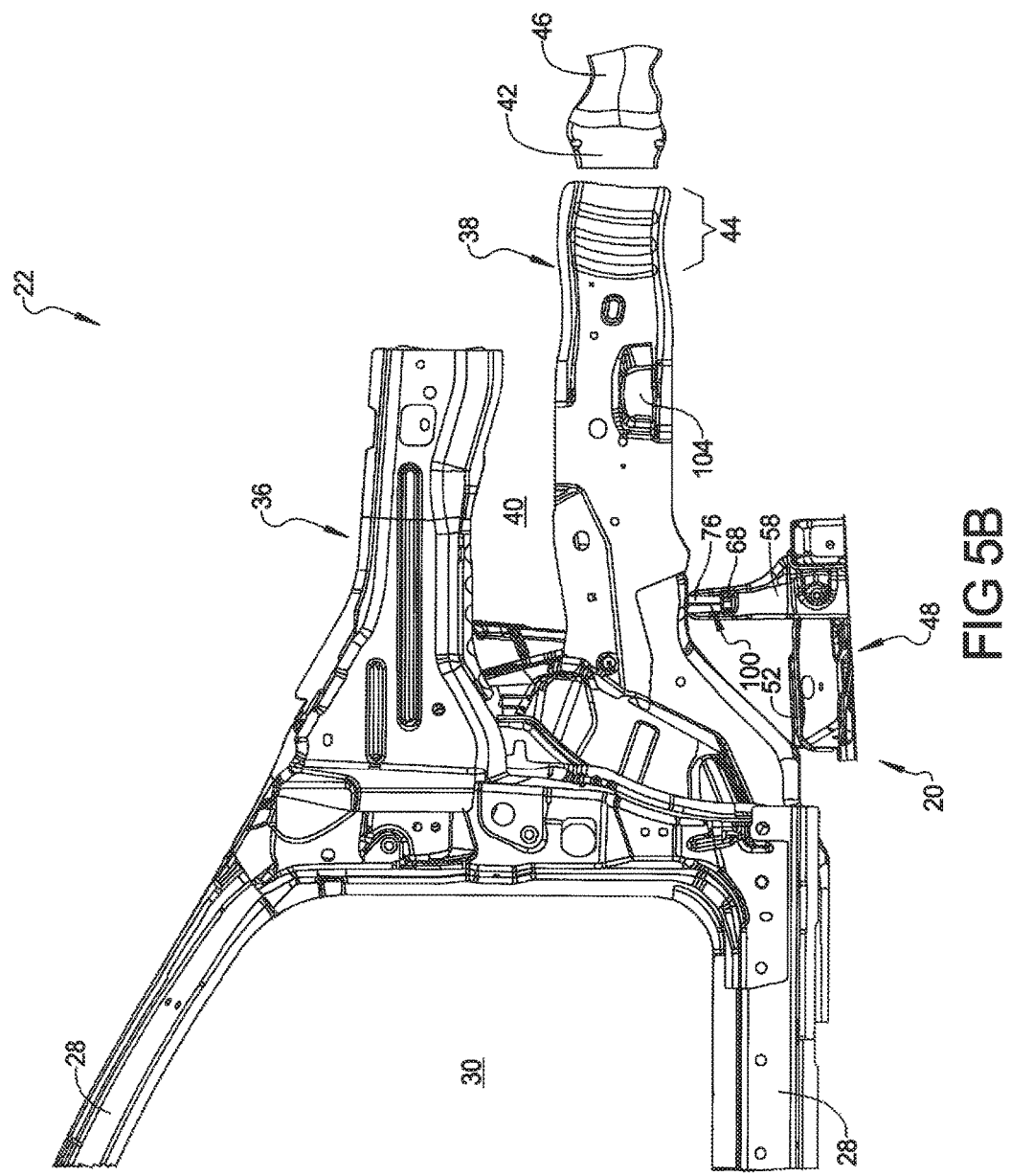
FIG. 5B is another side elevation view of the exemplary crossmember assembly shown in FIG. 1 that illustrates the pedestal while the impact event is occurring where detachment of the pedestal has begun.

FIG. 5B shows the crossmember assembly 20 as the impact event is occurring. In this state, detachment of each pedestal 58 has begun. Each main rail 38 includes one or more engineered deformation areas 104 that are configured to allow the pair of main rails 38 to deflect outwardly away from one another and away from the engine compartment 40 during the impact event. The slit 100 of each sleeve 76 may be positioned in a variety of different locations about the sleeve 76 without departing from the scope of the subject disclosure. In the example illustrated, each slit 100 is positioned along the exterior side 86 of each sleeve 76 such that outward deflection of the pair of main rails 38 pulls the pair of fasteners 68 laterally and outwardly through the slits 100 in the pair of pedestals 58. In FIG. 5B, the crash cans 42 and the crumple sections 44 of the main rails 38 have compressed and the pair of main rails 38 have begun to bend and deflect outwardly. The outward movement of the pair of main rails 38 away from the engine compartment 40 begins to pull the pair of fasteners 68 through the slit 100 in each sleeve 76 of the pedestals 58. As such, the sleeves 76 in FIG. 5B are beginning to 'open' because the shank portion 72 of the fasteners 68 are beginning to migrate through the slit 100 in each sleeve 76 along the release path 102.

FIG. 5C shows the crossmember assembly 20 at a later time during the impact event than that shown in FIG. 5B. In this state, detachment of each pedestal 58 has occurred (i.e. detachment is complete). The pair of main rails 38 have continued to bend outward and have now pulled the shank portion 72 of the fasteners 68 completely through the slit 100 in each sleeve 76 such that the pair of pedestals 58 and thus the crossmember 48 is no longer connected to the pair of main rails 38. As such, the sleeves 76 in FIG. 5C are 'open' because the shank portion 72 of the fasteners 68 have fully passed through the slit 100 in each sleeve 76 along the release path 102.

FIG. 5D shows the crossmember assembly 20 at a later time during the impact event than that shown in FIG. 5C. Once the pair of fasteners 68 have passed through the slit 100 in each sleeve 76 of pedestals 58, the pedestals 58 and the crossmember 48 drop away from the pair of mail rails under the influence of gravity. Because the pair of pedestals 58 have detached from the pair of main rails 38, the pair of pedestals 58 and the crossmember 48 cannot limit further deformation of the pair of main rails 38. As such, the pair of main rails 38 continue to bend outward from the position shown in FIG. 5C to the position shown in FIG. 5D. Advantageously, the additional deformation of the pair of main rails 38 provided by the pedestal detachment can absorb additional energy from the impact event and can minimize deceleration pulses that are transmitted through the vehicle 22 during the impact event. After pedestal detachment, the crossmember 48 may still remain connected to the vehicle body structure 28 by the pair of body mounts 54. Even though FIGS. 5A-5D illustrate the crash response of the crossmember assembly 20 during a typical front-end collision where both of the pedestals 58 detach from the pair of main rails 38, this is merely exemplary and the scope of the subject disclosure is not intended to be limited to any particular type of collision. It should be appreciated that depending on the force and orientation of the impact event, only one of the pedestals 58 may detach from the main rails 38 while still realizing the benefits described herein.

The vehicle body structure 28, the pair of main rails 38, the front bumper 46, the crossmember 48, the pair of suspension control arms 56, the pair of pedestals 58, and the pair of fasteners 68 may all be made of the same material, different materials, and combinations thereof. Suitable materials for these components include, without limitation, steel, aluminum, carbon fiber, cast iron, chromoly, and titanium. By way of non-limiting example, the sleeve 76 of each pedestal 58 may be made of any of the materials listed above or may be made of rubber, delrin, or other polymers. Although not required, the sleeve 76 of each pedestal 58 may be made of a more resilient/deformable material than that used for the vehicle body structure 28, the pair of main rails 38, the front bumper 46, the crossmember 48, the pair of suspension control arms 56, the pair of pedestals 58, and the pair of fasteners 68 to aid in the release of the fasteners 68 through the slit 100 in each pedestal 58.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A crossmember assembly of a vehicle comprising:
   a pair of main rails that are laterally spaced apart from one another;
   a crossmember that is transverse to said pair of main rails and that extends laterally between a pair of lateral ends;
   a pair of pedestals extending between and connecting said pair of lateral ends of said crossmember to said pair of main rails respectively, each pedestal having a lower end disposed adjacent to said crossmember and an upper end that projects upwardly away from said crossmember;
   a pair of fasteners connecting said pair of pedestals to said pair of main rails respectively; and
   each pedestal having a sleeve disposed at said upper end, each sleeve having a sleeve wall defining a bore therein that is configured to receive one of said fasteners, and each sleeve having a slit extending through said sleeve wall that provides a release path through which one of said fasteners pulls through said sleeve wall during an impact event to detach each pedestal from each main rail respectively.

2. The crossmember assembly as set forth in claim 1, wherein each pedestal of said pair of pedestals has an inboard side and an outboard side, said outboard sides facing away from one another, and each sleeve being supported on and extending from said outboard side of each pedestal.

3. The crossmember assembly as set forth in claim 2, wherein each sleeve has an interior side and an exterior side, said interior side of each sleeve abutting said outboard side of one of said pedestals, and each slit being positioned along said exterior side of each sleeve such that outward deflection of said pair of main rails during the impact event pulls said pair of fasteners laterally and outwardly through each slit in each sleeve of said pair of pedestals.

4. The crossmember assembly as set forth in claim 3, wherein said pair of main rails include engineered deformation areas that are configured to allow said pair of main rails to deflect outwardly away from one another during the impact event.

5. The crossmember assembly as set forth in claim 3, wherein each sleeve has a D-shaped cross-section with a flat portion disposed along said interior side of each sleeve and a curved portion disposed along said exterior side of each sleeve.

6. The crossmember assembly as set forth in claim 1, wherein each main rail terminates at a crash can with corrugated walls that deform during the impact event.

7. The crossmember assembly as set forth in claim 6, further comprising:
   a front bumper extending laterally between and fixedly connected to said crash cans.

8. The crossmember assembly as set forth in claim 1, wherein said bore of each sleeve extends along a bore axis and each slit extends along said sleeve wall in a direction that is substantially parallel to and spaced from said bore axis.

9. The crossmember assembly as set forth in claim 1, wherein said crossmember has an upper surface that is configured to at least partially support an engine of the vehicle.

10. A crossmember assembly of a vehicle for supporting an engine comprising:
    a vehicle body structure defining a passenger compartment and a pair of front wheel wells that are each sized to receive a front wheel of the vehicle;
    a pair of main rails disposed adjacent to said pair front wheel wells that provide structural support for said vehicle body structure;
    said pair of main rails being laterally spaced apart from one another such that an engine compartment is defined between said pair of main rails;
    a crossmember that is transverse to and disposed below said pair of main rails and that extends laterally between said pair of front wheel wells;
    said crossmember terminating at a pair of lateral ends and having an upper surface disposed between said pair of lateral ends that is configured to at least partially support the engine of the vehicle;
    a pair of pedestals extending between and connecting said pair of lateral ends of said crossmember to said pair of main rails respectively, each pedestal having a lower end disposed adjacent to and contacting said upper surface of said crossmember and an upper end disposed adjacent to and contacting one of said main rails;
    a pair of fasteners fixedly connecting said pair of pedestals to said pair of main rails respectively, each fastener including a shank portion;
    each pedestal having a sleeve disposed at said upper end, each sleeve having a first end, a second end opposite said first end, and a sleeve wall defining a bore that extends through said sleeve along a bore axis, said bore of each sleeve being open at said first and second ends of said sleeve to receive said shank portion of one of said fasteners; and
    each sleeve having a slit passing through said sleeve wall and extending between said first end and said second end, each slit providing a release path through which said shank portion of one of said fasteners pulls through said sleeve wall during an impact event to detach each pedestal from each main rail respectively.

11. The crossmember assembly as set forth in claim 10, wherein each pedestal of said pair of pedestals has an inboard side facing said engine compartment and an outboard side facing one of said front wheel wells and wherein each sleeve is supported on and extends from said outboard side of each pedestal.

12. The crossmember assembly as set forth in claim 11, wherein each sleeve has an interior side facing said engine compartment and an exterior side facing one of said front wheel wells and wherein each slit is positioned along said exterior side of each sleeve such that outward deflection of said pair of main rails during the impact event pulls said pair of fasteners laterally and outwardly through each slit in each sleeve of said pair of pedestals.

13. The crossmember assembly as set forth in claim 12, wherein said pair of main rails include engineered deformation areas that are configured to allow said pair of main rails to deflect outwardly away from one another during the impact event.

14. The crossmember assembly as set forth in claim 12, wherein each sleeve has a D-shaped cross-section with a flat portion disposed along said interior side of each sleeve and a curved portion disposed along said exterior side of each sleeve.

15. The crossmember assembly as set forth in claim 10, wherein said bore of each sleeve extends along a bore axis and each slit extends along said sleeve wall in a direction that is substantially parallel to and spaced from said bore axis.

16. The crossmember assembly as set forth in claim 15, wherein said shank portion of each fastener is substantially parallel to said bore axis of each sleeve.

17. The crossmember assembly as set forth in claim 10, wherein said shank portion of each fastener is threaded along at least part of its length and each fastener further includes a head portion and a nut that is threadably received on said shank portion.

18. The crossmember assembly as set forth in claim 17, wherein said first end of each sleeve abuts one of said main rails, said second end of each sleeve abuts said head portion of one of said fasteners, said shank portion of each fastener extends into one of said main rails, and said nut of each fastener abuts one of said main rails.

19. The crossmember assembly as set forth in claim 10, wherein said crossmember has an upper surface disposed between said pair of lateral ends that is configured to connect to and at least partially support the engine of the vehicle.

20. The crossmember assembly as set forth in claim 10, wherein said crossmember includes a pair of body mounts that extend toward said passenger compartment and connect to said vehicle body structure.

* * * * *